United States Patent
Kojima et al.

(10) Patent No.: US 7,268,903 B2
(45) Date of Patent: Sep. 11, 2007

(54) DATA TRANSFER METHOD, IMAGE PROCESSING METHOD, DATA TRANSFER SYSTEM AND IMAGE PROCESSOR

(75) Inventors: Akio Kojima, Osaka-fu (JP); Tatsumi Watanabe, Fukuoka-ken (JP); Yasuhiro Kuwahara, Fukuoka-ken (JP); Toshiharu Kurosawa, Fukuoka-ken (JP); Yusuke Monobe, Fukuoka-ken (JP); Hirotaka Oku, Osaka-fu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1020 days.

(21) Appl. No.: 10/050,175

(22) Filed: Jan. 18, 2002

(65) Prior Publication Data
US 2005/0195424 A1  Sep. 8, 2005

(30) Foreign Application Priority Data
Jan. 22, 2001  (JP)  ............................. 2001-012757

(51) Int. Cl.
*H04N 1/41* (2006.01)
*H04N 1/415* (2006.01)
(52) U.S. Cl. .............................. 358/1.15; 358/426.01; 358/2.1
(58) Field of Classification Search ...... 358/1.15–1.17, 358/426.07–426.09, 1.1–1.2, 1.9, 2.1, 3.22, 358/426.01, 426.04, 426.13, 426.14; 382/166, 382/232, 242–246
See application file for complete search history.

(56) References Cited

U.S. PATENT DOCUMENTS 5,467,134 A * 11/1995 Laney et al. ............. 348/409.1
5,903,360 A * 5/1999 Honma et al. ............. 358/450
6,125,201 A * 9/2000 Zador ...................... 382/166
6,181,435 B1 * 1/2001 Onodera .................... 358/1.14

FOREIGN PATENT DOCUMENTS

| JP | 04-044646 | 2/1992 |
|---|---|---|
| JP | 9-083809 | 3/1997 |
| JP | 09-083809 | 3/1997 |
| JP | 11-069166 | 3/1999 |
| JP | 11-088700 | 3/1999 |

OTHER PUBLICATIONS

Japanese Office Action with English translation issued in corresponding Japanese Patent Application No. JP 2002-012451, dated Feb. 14, 2007.

* cited by examiner

*Primary Examiner*—Thomas D. Lee
*Assistant Examiner*—Stephen Brinich
(74) *Attorney, Agent, or Firm*—McDermott Will & Emery LLP

(57) ABSTRACT

The invention relates to the data transfer method, the image processing method, the data transfer system and the image data processor for transferring digital data, especially for transferring image data. The invention has an object to provide the data transfer method, the image processing method, the data transfer system and the image data processor, wherein the compression ratio is changed corresponding to the transfer rate between connecting devices and the lack of image is avoided. The detecting means detects the data transfer capability of the transmission channel and the transfer end, and the control means changes the compression ratio of the digital data corresponding to the data transfer capability. Subsequently, the compressing means compresses the digital data based on the changed compression ratio and the transfer means transfers the compressed digital data to the transfer end.

8 Claims, 13 Drawing Sheets

FIG. 2

| SETTING MODE | COMPRESSION RATIO | CONTROL PARAMETER | |
|---|---|---|---|
| | | SIZE OF SMALL REGION | APPROXIMATE COLOR NUMBER |
| 1 | 1/6 | 4X4 | 2 |
| 2 | 1/3 | 4X4 | 4 |
| 3 | 1/4 | 8X8 | 8 |
| 4 | 1/6.4 | 16X16 | 8 |

FIG. 5

| | (a) INPUT SIGNAL | (b) AVERAGE | (c) DISPERSION | (d) SELECTED VALUE | (e) REGION INFORMATION $R_{ij}$ | (f) REPRESENTATIVE COLOR $C_n$ |
|---|---|---|---|---|---|---|
| $r_{ij}$ | 14 15 13 12<br>13 13 12 11<br>12 12 10 9<br>12 12 11 8 | $R_{ave}$<br>11.6875 | $R_d$<br>22.25 | | | IF $R_{ij} = 1$,<br>$C_{ij} = C_0$.<br><br>IF $R_{ij} = 0$,<br>$C_{ij} = C_1$. |
| $g_{ij}$ | 14 12 11 11<br>13 12 12 10<br>12 11 8 9<br>11 9 5 5 | $G_{ave}$<br>10.3125 | $G_d$<br>31.75 | $S_{ave}$<br>10.3125 | (grid with 1s and 0s;<br>502, 503, 504a labels)<br>IF $g_{ij} >$ Save,<br>$R_{ij} = 1$.<br>IF $g_{ij} <=$ Save,<br>$R_{ij} = 0$.<br>(WHERE $ij$:1~4) | $C_1 = (R_a, G_a, B_a)$<br>$R_a = 13$<br>$G_a = 12$<br>$B_a = 10$<br>$C_0 = (R_b, G_b, B_b)$<br>$R_b = 10$<br>$G_b = 8$<br>$B_b = 9$ |
| $b_{ij}$ | 10 12 9 9<br>12 12 9 7<br>11 9 8 9<br>10 12 7 10 | $B_{ave}$<br>9.8125 | $B_d$<br>21.375 | | | |

| PROCESSING MODE | SETTING MODE | COMPRESSION RATIO | CONTROL PARAMETER | |
|---|---|---|---|---|
| | | | SIZE OF SMALL REGION | APPROXIMATE COLOR NUMBER |
| CHARACTER MODE | 1 | 1/6 | 4X4 | 2 |
| CHARACTER MODE | 2 | 1/3 | 4X4 | 4 |
| CHARACTER MODE | 3 | 1/4 | 8X8 | 8 |
| PHOTO MODE | 4 | 1/6.4 | 16X16 | 8 |

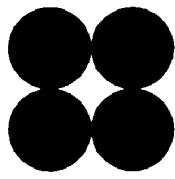
REDUCTION
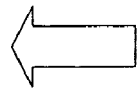
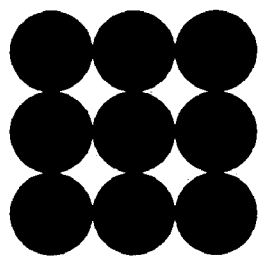
ORIGINAL
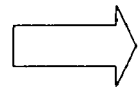
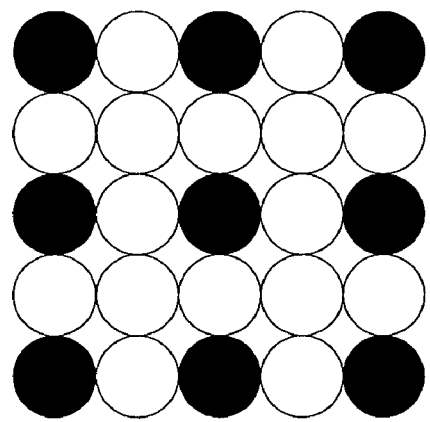
ENLARGEMENT : DOUBLE
FIG.12 A
FIG.12 B
FIG.12 C

DATA TRANSFER METHOD, IMAGE PROCESSING METHOD, DATA TRANSFER SYSTEM AND IMAGE PROCESSOR

BACKGROUND OF THE INVENTION

1. Field of the Invention

This invention relates to a data transfer method, an image processing method, a data transfer system and an image processor for transferring digital data, especially image data.

2. Description of the Related Art

For instance, there is a case that image data, which is prepared by the image preparing means such as the scanner (the handy scanner, in particular), the digital camera and etc., are stored temporarily in a hard disk of the personal computer through a specific transmission channel (the bus) and then devoted to the printing or displaying.

In such case, if the capability of the data processing in the bus or the device at transfer end falls short of the transfer size, the image data is compressed in size corresponding to the capability of the bus or the device at transfer end and then transferred to the device.

Here explains about a conventional method capable of setting flexibly the relation between the picture quality and the compression ratio, it has been well known the method (Japanese laid-open publication No. 09-083809) of handling a block size (which will be described later) and the number of colors as a parameter. The processing method is explained according to FIG. 13.

In this method, the image data is divided into blocks including a plurality of pixels. The block is to be represented approximately by a specific number of colors. Accordingly, it is possible to change the compression ratio by changing the number of pixels (a block size) included in the block or by changing the number of colors.

In FIG. 13, in case of changing the block size and the number of approximate colors to be set by parameter setting means 91, the compression ratio determined uniquely by those parameters is set in compressing means 94. The compressing means 94 can determine the compression ratio so as to meet with the memory size of storage means 95. According to such configuration, the compressing means 94 extracts the approximate colors from each block prepared by input means 92 and then stores them per block in the storage means 95.

In the conventional image processing method described above, the compression ratio is arranged to be set based on the matching of the memory size in such way. In order to obtain a desired picture quality and the compression ratio, the block size and the number of approximate colors are set as parameters.

On the other hand, considering the case of transferring the data from a specific device to the other specific device (for example, in case where a handy scanner is connected with a personal computer and the data is transferred from the handy scanner to the personal computer), and the handy scanner has to be provided with a memory equipped with a buffer function. However, from the aspects of the measurement and the price, the handy scanner cannot be provided with a mass memory including the buffer function. Therefore, if the transfer rate cannot be ensured sufficiently, the buffer will be overflowed and the lack of data will occurs. Therefore, the compression ratio must be determined corresponding to the data transfer rate between devices.

In addition, the device for reading the original surface operating the image sensor manually, like the handy scanner, repeats the stop and acceleration of the scanning so that the data size to be transferred can be adjusted, thereby it is possible to prevent the lack of data that appears because the buffer memory is small in size. However, under such method, since the position of image to be read various widely and the reading speed is not stable, the picture quality deteriorates. And the great difference of the picture quality is caused by the insufficiency of the user's skill causes. In such case, though the operation speed can be adjusted by increasing the size of buffer memory, a problem of the cost-up still remains.

SUMMARY OF THE INVENTION

The present invention is proposed in consideration for the above conventional conditions, and has an object to provide the data transfer method, image processing method, data transfer system, and image processor for changing the compression ratio corresponding to the transfer rate between the connected devices and preventing the lack of images.

In order to resolve the above subjects, the data transfer system of the invention adopts the following means. Specifically, it is assumed that the digital transfer system transfers digital data. In this system, when detecting means composing the digital transfer system detects the data transfer capability of a transmission channel and a transfer end, control means changes the compression ratio of the digital data corresponding to the data transfer capability. Subsequently, compressing means compresses the digital data based on the changed compression ratio, and transfer means transfers the compressed digital data to the transfer end.

Accordingly, the digital data is compressed corresponding to the transfer rate; thereby the digital data can be stored in the transfer end device without the lack of data even if the transfer source or end device is provided with a small size of buffer memory.

Besides, the control means may be configured so as to involve the control of selecting whether the compressing is performed or not.

Additionally, if the digital data is image data, the data transfer system may be configured that representative color extracting means may be used as the compressing means in order to reduce the size of image data by replacing a color in the small region of the image data with a plurality of approximate colors. Further, the change of the compression ratio may be executed by changing the size of the small region or the number of approximate colors.

Further more, the data transfer system is provided with processing mode setting means for changing the processing mode corresponding to the type of the objective original, wherein the change of the compressing ratio is changed based on the size of the small region or the number of approximate colors corresponding to the processing mode.

According to the above configuration, the optimum control parameter can be set corresponding to the type of objective original, thereby the invention has effects that it is possible to restrain the deterioration of picture quality and to carry out the precise image transfer. Besides, the type of original may be determined to be at least one of a "photo image", a "character image", or a "character and photo image".

Moreover, the data transfer system may be configured so as to comprise resolution converting means for enlarging or reducing the image data at a specific scale, wherein the control means determines the number of representative colors and the size of the small region to extract the representative color based on the transfer capability and the specific scale, and the representative color extracting means extracts a plurality of representative colors from the determined small region.

Under such configuration, in case where the resolution converting or the enlargement and reduction processing is performed, the small region to extract the representative color is changed in size considering the resolution in addition to the transfer rate, thereby it is possible to retain the pattern of transition ratio of the density between pixels and to restrain the deterioration of picture quality. Additionally, it is possible to improve the compression ratio with keeping the picture quality.

Further more, the data transfer system presupposes an image processor wherein the image data is processed per a unit of a specific small region, colors in the small region are approximated by plural representative colors. Under such configuration, resolution converting means converts the image data to a specific resolution, region determining means determines the size of the small region to extract a representative color corresponding to a specific resolution, and representative color extracting means extracts a plurality of representative colors from the determined small region.

Therefore, the size of the region to extract a representative color is changed corresponding to the resolution; thereby it is possible to retain the pattern with high frequency and to restrain the deterioration of the picture quality. And, it is possible to improve the compression ratio with keeping the picture quality.

Besides, under the configuration presupposing an image processor wherein the image data is processed per a unit of a specific small region, colors in the small region are approximated by plural representative colors, mode setting means determines the processing mode based on the objective original, control means determines the specific number of representative colors or the size of small region to extract a representative color corresponding to the selected processing mode, and representative color extracting means extracts the specific number of representative colors from the small region based on the result made by the control means. And under such configuration, resolution converting means enlarges or reduces the image data at a specific scale, control means determines the size of small region to extract the representative color corresponding to the specific scale, and representative color extracting means extracts a plurality of representative colors from the determined small region.

BRIEF DESCRIPTION OF THE DRAWINGS

FIG. 2 is a schematic diagram of the control parameter in the first embodiment of the invention.

FIG. 5 is a schematic diagram of the representative color extracting circuit 1 in the first embodiment of the invention.

FIG. 9 is a schematic diagram of the processing mode in the second embodiment of the invention.

FIGS. 12A, 12B and 12C are schematic diagram of the processing of enlargement and reduction in the third embodiment of the invention.

DESCRIPTION OF THE PREFERRED EMBODIMENTS

The preferred embodiments of this invention are explained hereinafter according to the drawings. Basically, the invention can adopt any kind of device as the device to be a transfer source and a transfer end of the digital data. However, the following embodiments note that an image inputting device is adopted as the transfer source device, and a personal computer is as the receiving device.

Embodiment 1

According to FIG. 1 and FIG. 2, the first embodiment of the invention is explained as follows.

Figure 1:
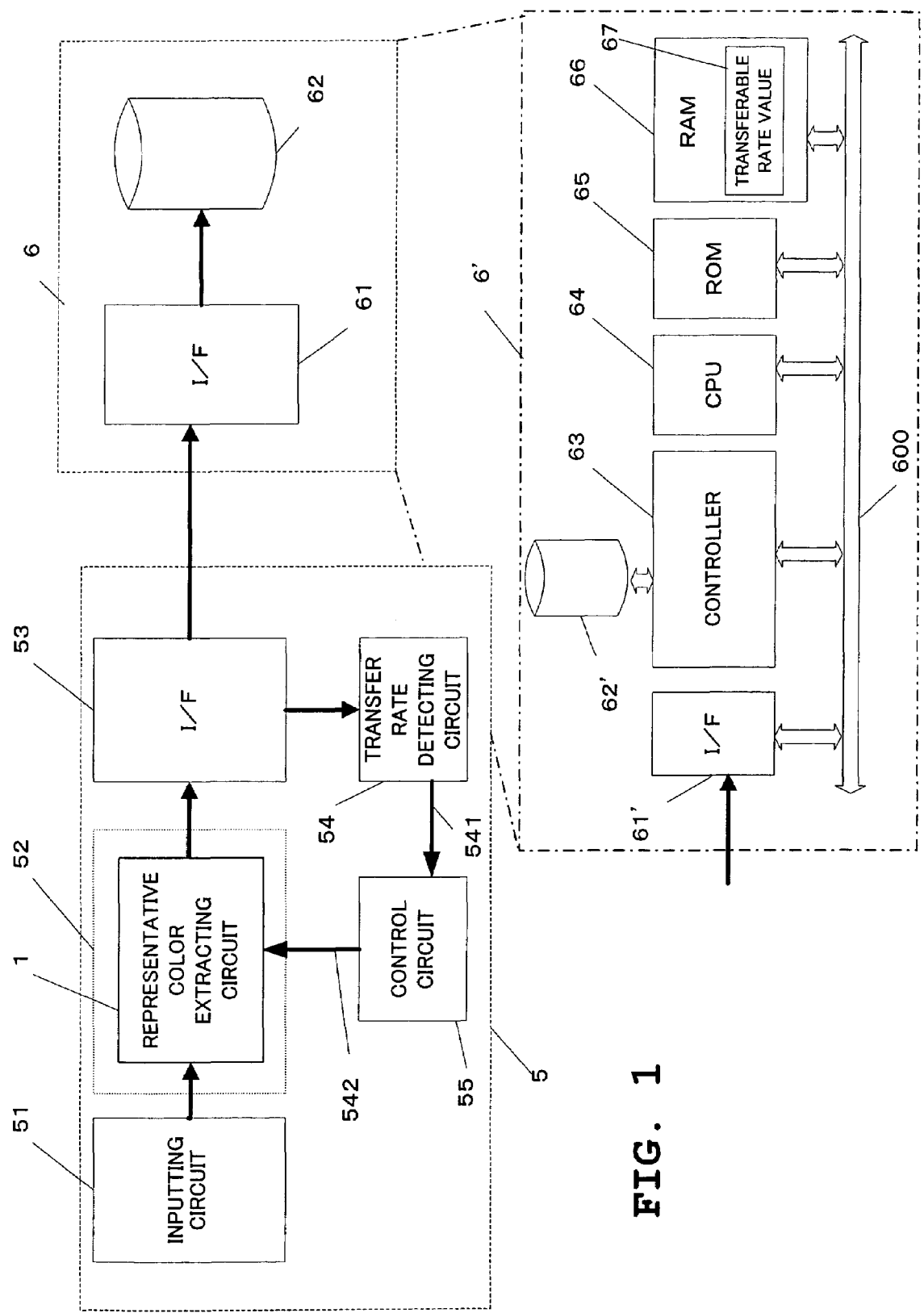
FIG. 1 is a block diagram of the image processor in the first embodiment of this invention.

FIG. 1 is a block diagram of the image processor in the first embodiment of the invention, and FIG. 2 is an explanatory diagram of the control parameter.

FIG. 1 explains the operation in case where an image inputting device 5 to be a transfer source of digital data is connected with a transfer end device. The image inputting device and the transfer end device are not specified definitely. However, the example in this embodiment refers to the following case: the handy scanner is utilized as the image inputting device, and connected with a personal computer 6 of the transfer end device (which is called PC6 hereinafter). Besides, it is PC6' illustrated by a dot and dash line that explains in detail about the configuration of PC6 in FIG. 1. That is to say, PC6 comprises interface 61' (which is called I/F hereinafter), HDD 62', controller 63, CPU 64, ROM 65, RAM 66 and bus 600 for connecting those devices. Additionally, the RAM 66 stores a transferable rate value 67.

First of all, the image inputting device 5 inputs the image data inputted from an inputting circuit 51 like the CCD element, for example, into a compression circuit 52, and the compressed image data therein is outputted to the outside through I/F 53.

When the image inputting device 5 is connected with PC6, a transfer rate detecting circuit 54 of the image inputting device 5 detects the transfer rate that is the speed capable to transfer the data from I/F 53 to PC6.

The transfer rate toward the PC6 is determined by considering all the various factors together: the writing rate or the reading rate of HDD 62 (HDD 62'), the transfer rate of bus 600, the performance of a controller 63 of HDD, the processing speed of CPU 64, the reading/writing rate of a temporary storage memory (RAM) 66, the response speed of I/F 61 (I/F 61'), and the transfer capability (rate) of the bus connecting I/F 53 and I/F 61. That is to say, the transfer rate is determined so as to match with the device having the minimum value among all the above-mentioned kinds of speed, so that it is possible to ensure the transfer rate of the data transferred at real time.

In this embodiment, the transfer rate of each device (61 to 67) composing PC6 (the processing speed, the response speed, and etc.) has been written into ROM 65 of PC6 in advance, and based on those values CPU 64 can detect (search) the minimum transfer rate and store it in RAM 66 as the transferable rate value 67. CPU 64 in response to the inquiry from an outside device (the image inputting device 5, in this case) informs as the transfer rate the detected transferable rate value 67 that is the maximum speed capable of transferring data.

The method of determining the transfer rate can be also carried out by the following way: CPU 64 writes the test data into HDD 62 through bus 600, calculates the transferable rate value 67, and then stores it in RAM 66 temporarily. If the program executing the writing of such test data has been installed in PC6 in advance, it is possible to detect the general transferable rate value 67 including the response speed of CPU 64. In response to the inquiry from the outside device, CPU 64 informs the transfer rate on the basis of the transferable rate value 67 stored in RAM 66 as described above.

The information of the transfer rate is executed by the following way: after setting a speed code field in an initial data for the negotiation between the image input device 5 and PC 6 at the time of executing the negotiation, the transfer rate written into the ROM 65 or the one obtained by the writing test is written into the corresponding field.

Next, the method of detecting the transfer rate of the transmission channel connecting the image input device 5 and PC6 is as follows: for example, if the transmission channel is the USB (Universal Serial Bus) type, I/F 53 of the image inputting device 5 judges whether the PC6 has the full speed transfer capability or the low speed one based on whichever of two signal pins is "H". In case of USB 1.1 standard, the full speed transfer is 12 Mbps and the low speed transfer is 1.5 Mbps, (while in case of USB 2.0 standard, the former is 480 Mbps and the latter is 2.0 Mbps). Besides, the transfer rate of the transmission channel may be detected by receiving the response speed (processing speed) of I/F 61 stored in ROM 65 from CPU 64, or by judging the transfer capability in result of receiving the response to the test data sent from I/F 53.

The transfer rate detecting circuit 54 determines the transfer rate on the basis of the transfer rate of PC6 transferred from PC6 as above and that of the transmission channel detected by I/F 53.

On the other hand, the image data read from the inputting circuit 51 is compressed by the compressing circuit 52. The compression ratio for this image data is determined according to a parameter predetermined by the control circuit 55 as follows.

According to the transfer rate detected by the transfer rate detecting circuit 54, the control circuit 55 determines the compression ratio and then sets the parameter in the compression circuit 52.

The compressing method (compression circuit 52) to be applied to the embodiments of the invention is not restricted to this particularly, but any other methods is available if it is possible to estimate the data size to be reduced. The invention adopts as a preferable embodiment a representative color extracting circuit 1 that will be explained later. The method is to express an objective image data by a representative color (an approximate color) extracted per small region including a plurality of pixels.

In this method, the number of representative colors (approximate color numbers) and the region size (the number of pixels) are defined as parameters; thereby the compression ratio can be changed by a fixed length.

The compression ratio is expressed as follows: The compression ratio=(approximate color number/pixel number in a small region)+(bit number of color index information/bit number of RGB)

In the above expression, the term of "color index" means the number imparted to each representative color, which is expressed by the following bit number:
*Color index information:
where the approximate color number is 2, 1 bit,
where the approximate color number is 4, 2 bit; and
where the approximate color number is 8, 3 bit.
*RGB bit number where each color is 8 bits:

8+8+8=24 bits

FIG. 2 shows the compression ratio per each setting mode (that is a type of a setting determined by the approximate color number and the small region size). The setting mode (compression ratio) with a pair of the approximate color number and the small region size (the pixel number) is predetermined in the control circuit 55. The control circuit 55 selects the setting mode (the left end column in FIG. 2) corresponding to the transfer rate detected as above, and sets the corresponding control parameter in the compression circuit 52.

The image data outputted form the inputting circuit 51 is compressed by the compressing circuit 52 according to the control parameter, and transferred to I/F 61 of PC6 through I/F 53, and then stored in HDD 62. Since the compression ratio in the above description is determined in consideration of the transfer capability of the transmission channel and the writing speed (transfer rate) of the storage means 62, the image data can be stored in HDD 62 without any lack.

Besides, the above description explains the image inputting device as an example. The invention is a method that can be applied to any configuration for compressing the data and transferring it to the connected transfer end device.

For instance, a device similar to the image inputting device 5 of the invention is provided between I/F 61 of PC6 and HDD 62 (said device is only for processing the digital data and does not always need to process the image data), thereby the data compression ratio is determined in accordance with the reading/writing ability of HDD 62 and then stored. Therefore, it is possible to write or read the data without the lack.

The following description explains in details about the processing of the representative color extracting circuit 1. The method of extracting the representative color is one of the fixed length coding methods most adequate to the real time processing. Like the above description, the coding method is that the size of image data is compressed by extracting the representative color (the approximate color) from the objective image data and expressing the small region by the representative color.

In such processing, the colors composing the color space is not specified particularly, however, this embodiment is explained taking the R (Red), G (Green) and B (Blue) space as an example (and the red is expressed by R, the green by G, and the blue by B hereinafter).

The preferred embodiment of the representative color extracting method is explained in detail according to FIGS. 3, 4, 5, 6 and 7.

Figure 3:
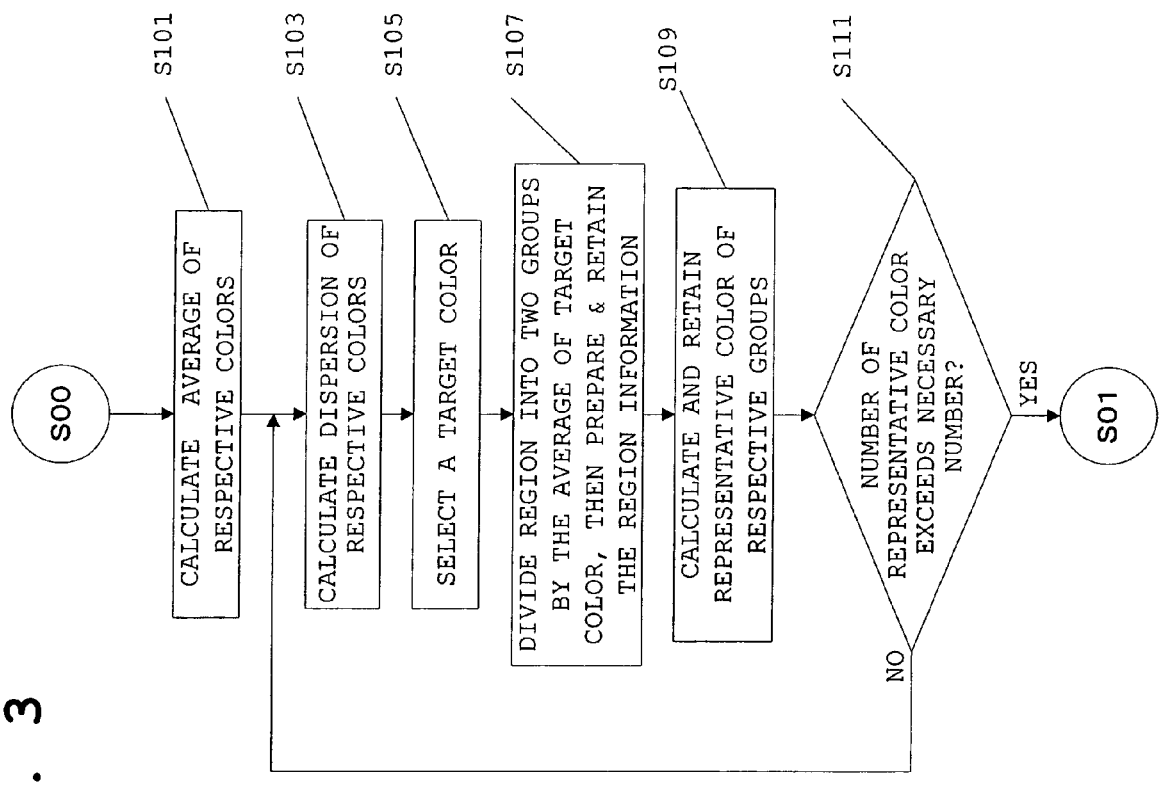
FIG. 3 is a flowchart showing the extracting of representative color in the first embodiment of the invention.

According to FIG. 3, the flow of the representative color extracting is explained. FIG. 3 is a flowchart of the processing of the representative color extracting.

In FIG. 3, the processing starts, and after adding all the density value per color of each pixel composing an objective small region, the sum is divided by the number of pixels whose density values are added up, thereby the color average of the density of pixels in the region is calculated (Step S00 to S101).

Next, the dispersion of each color is calculated (Step S103). The simple method for calculating the dispersion is to find the absolute value of the difference between each color average and the density value of each pixel, and accumulate (add) all the absolute value of the difference. Here, where the group dividing that will be explained later has already been executed, the color dispersion of each group prepared by the dividing is calculated. Thereby, as described below, after detecting the color with the maximum dispersion value of each group obtained by the dividing, the region is further divided into two groups regarding the detected color.

Next, after detecting the color with the maximum dispersion, the color is determined as a target color. For instance, where the dispersion of G is the largest, G becomes the target color (Step S105).

And by using the average of the target color the small region is divided into two groups. Since the target color is G, the region on the G axis is divided on the basis of the G's average. This dividing is executed based on the result from comparing whether the density value of pixel is larger than the average or not (Step S107).

In the next step, the information of the region obtained in result of the group dividing (the information about which region of representative color each pixel belongs to) and the representative color of each group are calculated. The representative color is the density average of each pixel in each group. The obtained region information and the representative color are stored as the intermediate coded data temporarily (Step S109).

Next, the obtained representative color number is judged to be the desired number (the color number set by the control circuit, for example) or more. And if the color number is more than the desired one, the dividing is completed. If the number is short, the processing turns back to the step of calculating the dispersion (Step S103) and the dividing is repeated.

After repeating the above processing n-times, it is possible to obtain $2^n$ groups and extract the representative color of each group. When the number of representative colors is the desired one, the dividing is completed (Step S01). In addition, regarding next objective small region, the above-mentioned series of processing is executed.

Figure 4:
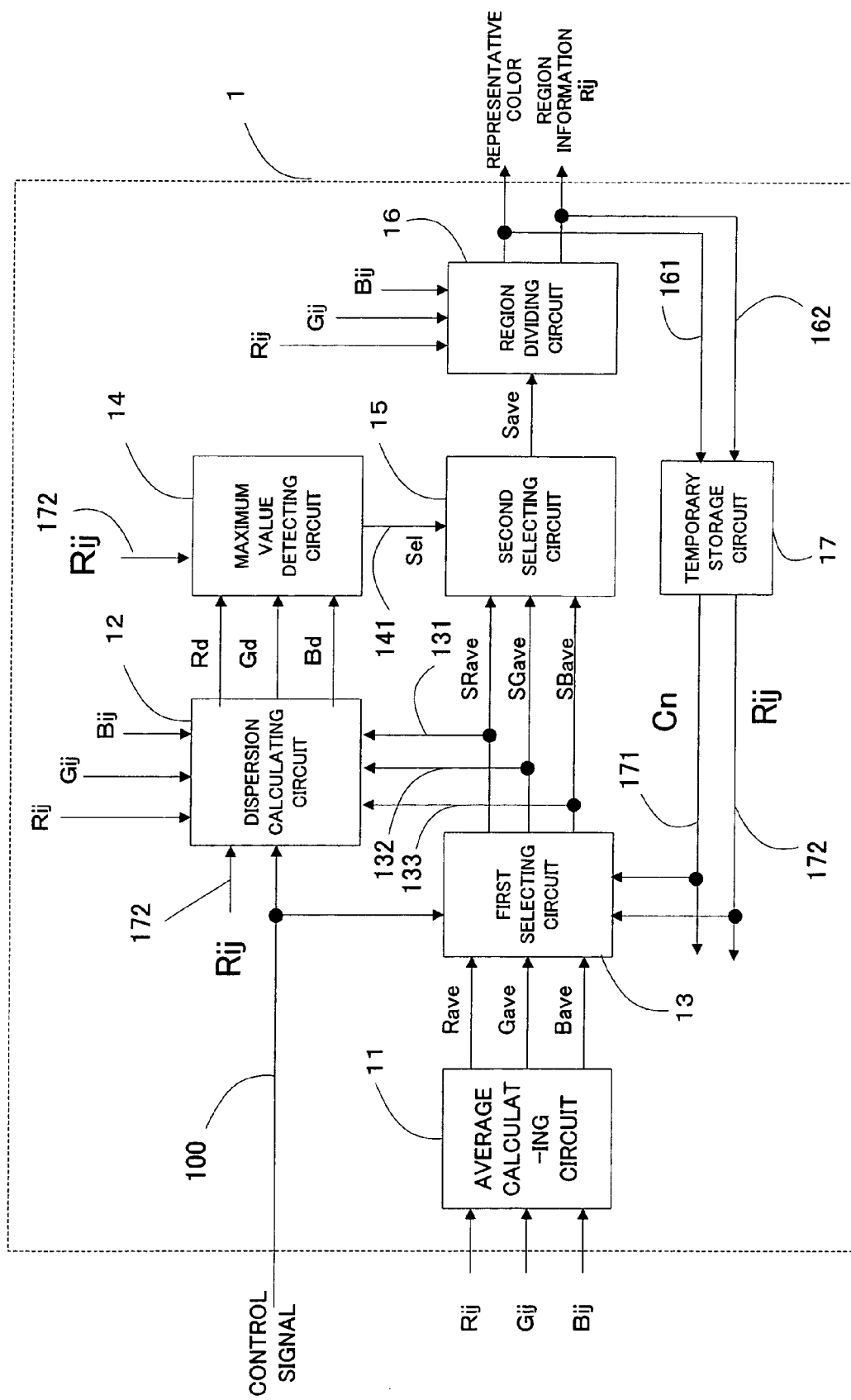
FIG. 4 is a block diagram of the representative color extracting circuit 1 in the first embodiment of the invention.

Now, the operation of the representative color extracting is explained in detail according to FIG. 4. FIG. 4 is a block diagram of the representative color extracting circuit 1.

In FIG. 4, the average calculating circuit 11 adds up per color all the density values Rin (Red input), Gin (Green input), and Bin (Blue input) of each color pixel in the small region, and then the sum is divided by the pixel number in the small region. Thereby it is possible to calculate the each color average, Rave (Red average), Gave (Green average), and Bave (Blue average). Where the pixel number in the small region is N, the each color average is expressed by Rave=(ΣRin)÷N, Gave=(ΣGin)÷N, Bave=(ΣBin)÷N, respectively.

Next, when the control signal 100 is "H", a first selecting circuit 13 selects the output signal (Rave, Gave, Bave) of the average calculating circuit 11. On the other hand, when the control signal 100 is "L", the selecting circuit 13 selects the representative color Cn (n: a suffix for sectionalizing a first small region) stored in a temporary storage circuit 17 and the region information Rij (ij: a suffix indicating the position of pixel, and the i direction is perpendicular to the j direction.

See FIG. 5), and then outputs the selected signals (SRave, SGave, and SBave). The control signal 100 turns to "H" at the first dividing, and the output of the average calculating circuit 11 is inputted into the first selecting circuit 13. As of the second dividing, the control signal 100 turns to "L", and the output of the temporary storage circuit 17 is inputted into the first selecting circuit 13.

Next, the dispersion calculating circuit 12 calculates the dispersion Rd, Gd and Bd for each color. According to the above-mentioned simple method, the dispersion is calculated by finding the absolute value of the difference between the density of each pixel and the average and then accumulating (adding up) all the absolute values per color. Here, the each color dispersion is expressed by Rd=ΣABS(Rin−SRave), Gd=ΣABS(Gin−SGave), and Bd=ΣABS(Bin−SBave), respectively. Besides, ABS( ) is an operator indicating an absolute value. Additionally, where the region has been divided into two groups once, the dispersion for each color is calculated per each group. This processing is for finding the color of which the dispersion is large within the divided region and then dividing the region in the order of the dispersion of the color.

In the next place, a maximum value detecting circuit 14 detects the color with the maximum dispersion as the target color. Where the dispersion is Gd>Rd>Bd, G becomes a target color.

A second selecting circuit 15 selects the average of target color on the basis of the selected signal (Se1) 141 obtained from the maximum value detecting circuit 14. Since the target color is G, the average Save is expressed by Save=SGave.

A region dividing circuit 16 divides the objective small region into two groups on the basis of the average of the selected target color. Since the target color is G, the values are compared to be large or small on the G axis and the objective small region is divided in the comparing result. That is to say, the region information Rij is "1" where Gin>Save, while Rij is "0" where Gin<=Gave as shown in FIG. 5. At the same time, two representative colors Cn are calculated for each group respectively. For instance, the average of each color pixel of which the region information Rij belongs to "1" is defined as C0, while the average of each color pixel of which the Rij belongs to "0" is defined as C1.

The respective color 161 and the region information 162 are retained in the temporary storage circuit 17, and used for the dividing as of the second time.

According to FIG. 5, a concrete example of the numerical processing is explained hereinafter as the preferred embodiment. FIG. 5 is an explanatory diagram showing the processing of the representative color extracting circuit 1.

In FIG. 5, the left column shows the input signal of each color to be an object of the processing, rij, gij, and bij. The average of input signals rij, gij, and bij for each color is expressed by Rave=11.6875, Gave=10.3125, and Bave=9.8125. The dispersion of each color is evaluated as Rd=22.25, Gd=31.75, Bd=21.375. Here, since the color with the maximum dispersion is G, G is selected as the target color. Therefore, Save=10.3125. On the basis of this G average, the objective region is subdivided into sections as described below.

That is to say, it is possible to divide the region into a section 502 that can be expressed by Rij=1 where gij>Save, and a section 503 that can be expressed by Rij=0 where gij<=Save. In addition, the region information 504*a*(Rij) is prepared. At this time, representative colors C0 and C1 are prepared as the representative color Cn. In this case, the C0 is the average of each color pixel (Ra, Ga, Ba) of which region information Rij belongs to "1". The C1 is the average of each color pixel (Rb, Gb, Bb) of which region information Rij belongs to "0".

The actual averages are Ra=12.6, Ga=11.9, Ba=10.4, Rb=10.16667, Gb=7.666667, and Bb=8.833333, however, those are rounded to the nearest whole number by rounding each decimal place, that is, Ra=13, Ga=12, Ba=10, Rb=10, Gb=8, and Bb=9.

When the next dividing is executed, the sections 502 and 503 may be selected as an objective small region and the same dividing as the above processing may be executed regarding said each objective small region.

The following description refers to the method of retaining the region information Rij.

Figure 6:
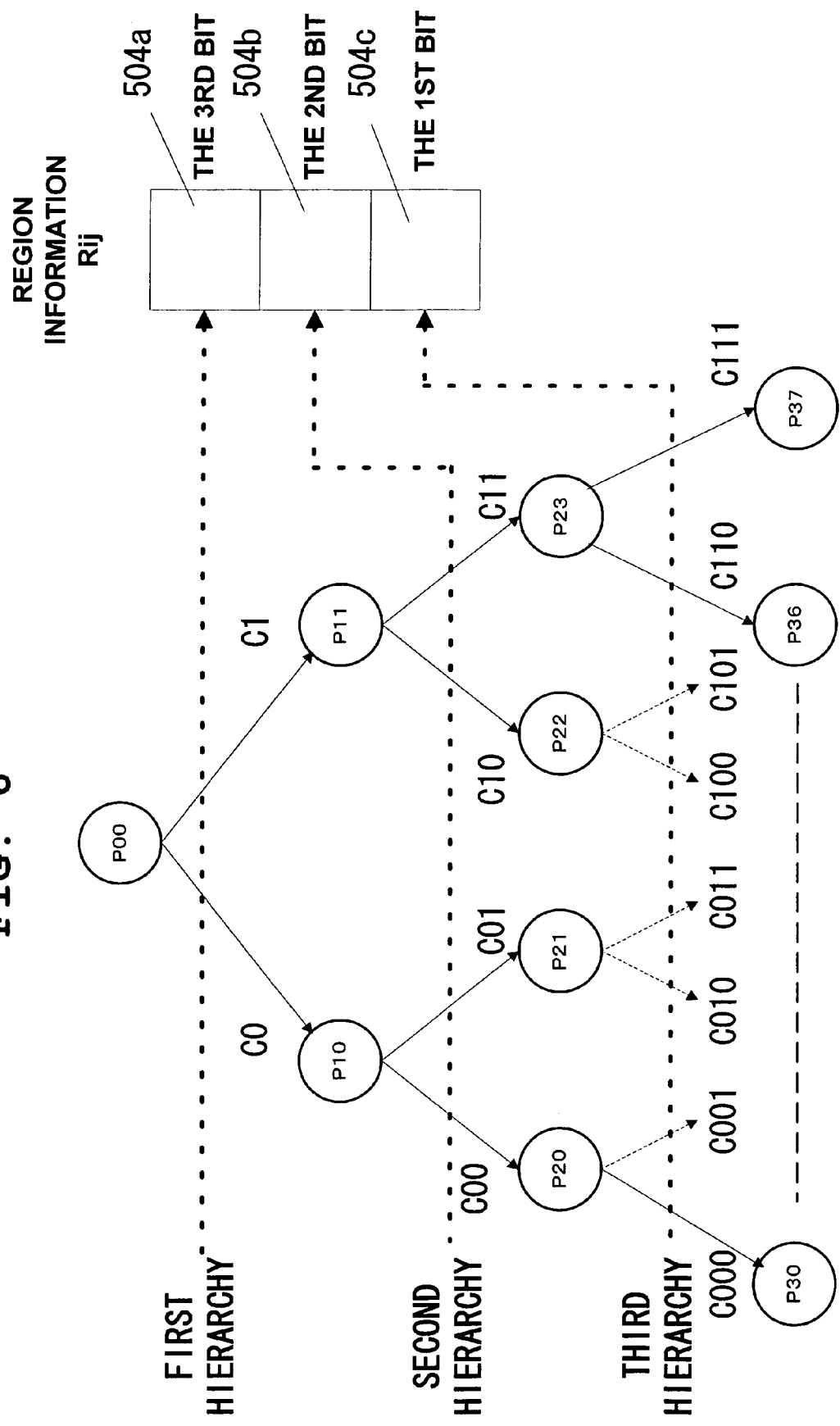
FIG. 6 is a schematic diagram of the retention of region information in the first embodiment of the invention.

FIG. 6 is an explanatory diagram at the time of retaining the region information. The representative color extracting circuit 1 outputs the region information Rij and the representative color Cn of each region whenever the dividing is repeated. As shown in FIG. 4, whenever the dividing is repeated, the region information Rij is retained in respective information bits of the temporary storage circuit 17 per processing hierarchy. If the necessary representative color number is 8, the dividing is repeated by the third hierarchy, so that each bit of the region information Rij may need 3 bits. The first hierarchy is retained in the third bit (504a), the second hierarchy is retained in the second bit (504b), and the third hierarchy is retained in the first bit (504c). In this case, the hierarchy and the bit number do not need to be determined in particular, however, those may be retained per processing hierarchy in a specific bit independently.

Thereby, it is possible to specify the bit to be referred per processing hierarchy. For instance, when the processing P10 and P11 of the second hierarchy are executed, it may refer only to the third bit prepared at the first hierarchy. And when the processing P20 to P23 of the third hierarchy is executed, it may refer to the third bit (504a) and the second bit (504b) prepared at the first and second hierarchies respectively. In this way, it may refer only to the region information Rij prepared at the last dividing.

Figure 7:
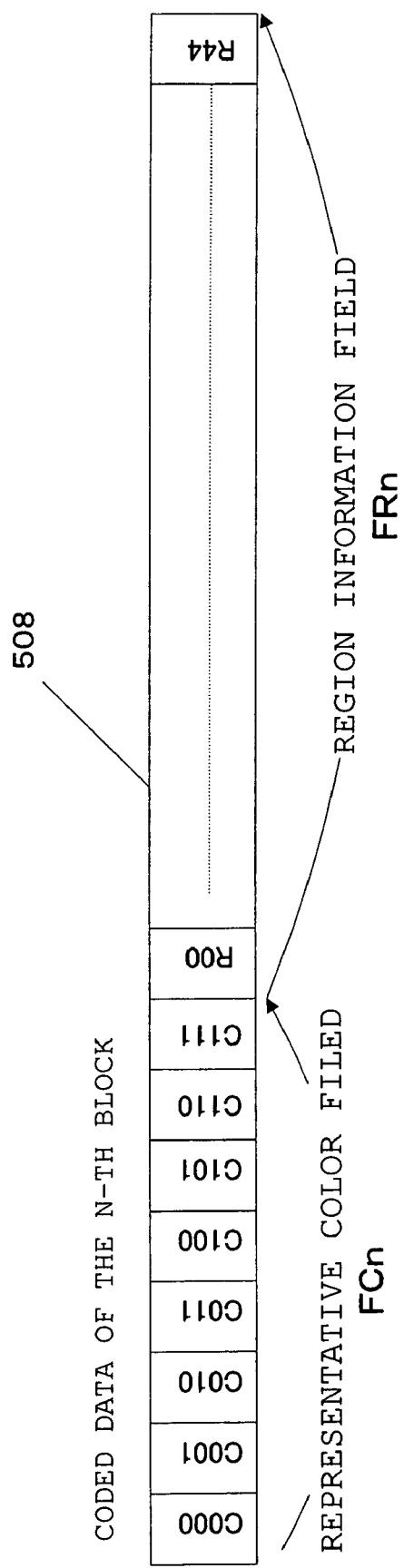
FIG. 7 is a block diagram of the coded data in the first embodiment of the invention.

The following description refers to the coded data transferred from the image inputting device to PC6. FIG. 7 is a block diagram of the coded data.

In FIG. 7, the coded data 508 of the n-th block is a fixed length, and comprises representative color fields FCn storing the representative colors and region information fields FRn storing the region information data. The representative color fields FCn stores the representative color Cn to be used (=respective density value of R, G, B). Into the region information field FRn, the information of the representative color corresponding to each pixel is written. It is assumed in this embodiment that the extracted representative color number is 8 and the small region is 16 pixels of 4×4. In order to approximate the small region by the two colors, the following processing is executed. Where the approximate data of two colors are C2a and C2b, C2a and C2b can be found by calculating C2a=(C000+C000+C010+C011)÷4 and C2b=(C100+C101+C110+C111)÷4 by using the coded data C000 to C111 of each representative color. The display color Cij of each pixel is determined as shown in the right column (condition 505) in FIG. 5 based on the condition 505 corresponding C2a and C2b to "1" and "0" of the region information Rij (504a).

In case of obtaining approximate data of 4 colors, C4a, C4b, C4c and C4d, each can be found by calculating C4a=(C00030 C001)÷2, C4b=(C010+C0111)÷2, C4c=(C100+C101)÷2, and C2d=(C110+C111)÷2 using the coded data C000 to C111. According to the above processing, the necessary color number is calculated.

Embodiment 2

The invention of the first embodiment is arranged that the compressed data be transferred by detecting the data transfer capability between the connected devices and changing the compression ratio according to the transfer capability, in result it is possible to prevent the lack of data.

As the image original to be an object of processing, there are the photograph original, the character (text) original, or the character and photo original. Since the necessary resolution depends on the characteristics of the original, it is necessary to process images corresponding to the type of original. Particularly, in case where the representative color extracting circuit 1 is applied to the compression circuit 52, it is arranged that the size of small region is changed according to the necessary resolution; thereby it is possible to restrain the deterioration of the picture quality.

Figure 8:
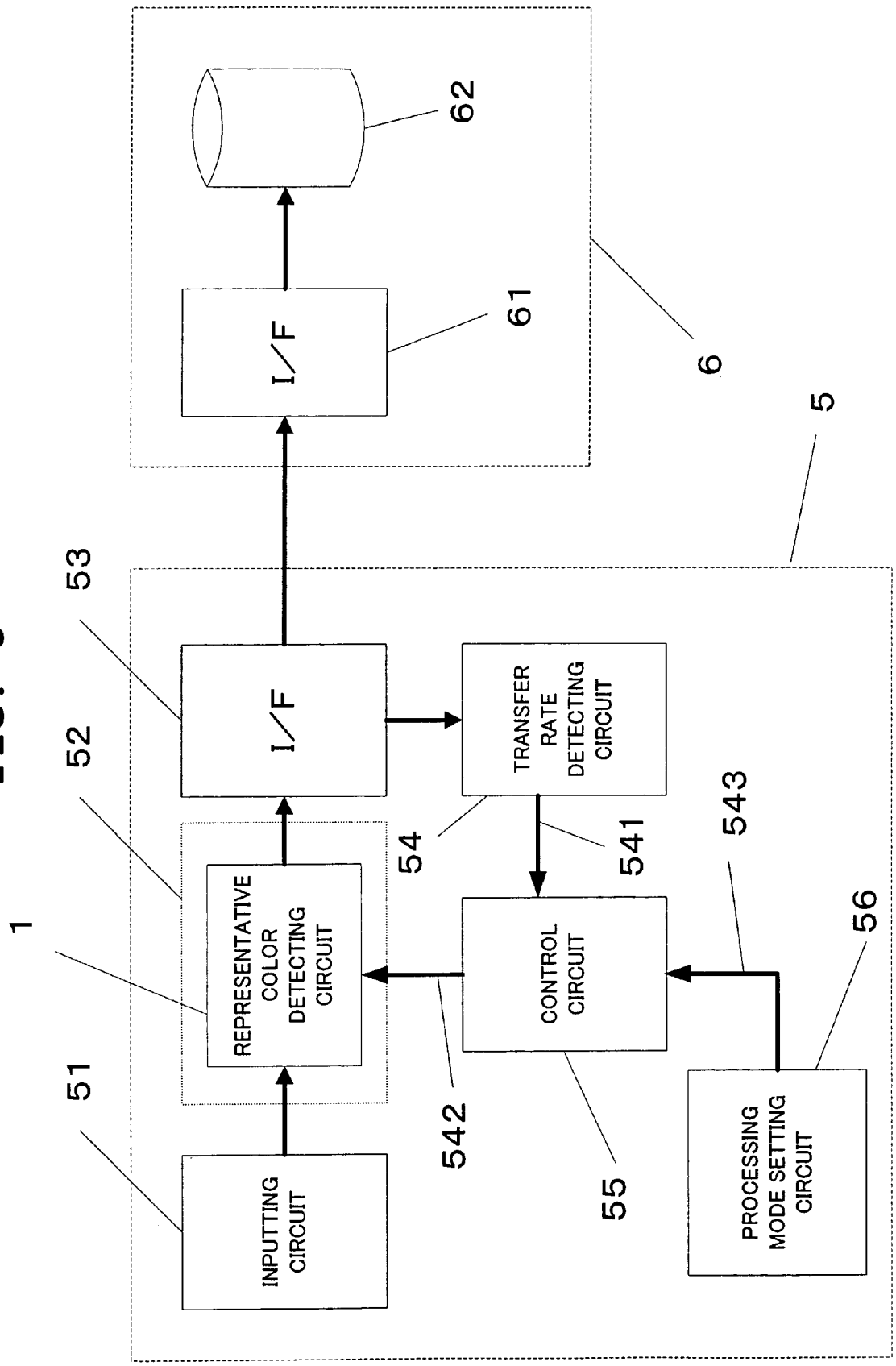
FIG. 8 is a block diagram of the image processor in the second embodiment of this invention.

According to FIGS. 8 and 9, the image processor in the second embodiment of the invention is explained hereafter.

FIG. 8 is a block diagram of the image processor in the second embodiment of the invention, and FIG. 9 is an explanatory diagram of the processing mode of the second embodiment.

The arrangement different from that of the first embodiment is that the processing mode is set in the control circuit 55 from a processing mode setting circuit 56 capable of judging the type of original, for example.

The control circuit 55 selects the setting mode of the appropriate compression ratio based on transfer rate information 541 of the transfer rate detecting circuit 54 and a processing mode 543 of the processing mode setting circuit 56. As shown in FIG. 9, there are the "photo mode" and the "characters mode" as the processing mode, which are obtained in result of judging of the original type by the processing mode setting circuit 56. If the original is "photo image", the "photo mode" is corresponding to it. If the original is the "characters image", the "character mode" is corresponding to it. Thereby, the control circuit 55 sets "3" or "4" in the setting mode when the processing mode 543 sent from the processing mode setting circuit is the "photo mode". If the "characters mode", "1" or "2" is set in the setting mode. Subsequently, the control circuit 55 determines the size of the small region or a specific number of representative colors based on the selected setting mode. Next, the control circuit 55 transmits as the parameter to the representative color extracting circuit 1 the size of the small region and the specific number of representative colors determined as above.

At the time of receiving the parameters, the representative color extracting circuit 1 extracts the specific number of representative colors from the small region based on the determination of the parameter.

Besides, though the processing modes are defined as the "characters mode" and the "photo mode", if the original includes the characters image and the photo image, the "character and photo mode" may be set. If it is possible to specify the processing mode according to the type of original, the contents of the setting could not be restricted to this. By determining the control parameter most suitable to the objective original and the image processing like the "map mode" or the "enlargement and reduction mode", the deterioration of the picture quality can be suppressed.

As described above, the invention in the second embodiment can restrain the deterioration of images by setting the suitable control parameters according to the objective original and image processing. Therefore, it is possible to carry out the precise image transfer.

Embodiment 3

The representative color extracting method is the application of the human's visual literacy and the important thing to extract the representative color restraining the visual deterioration is the relation between the resolution to be set and the size of the objective region from which the representative color is extracted. Accordingly, it is arranged in the invention that the size of the objective region, from which the representative color is extracted, be changed corresponding to the setting of the conversion ratio of the resolution. That is to say, when the resolution is high, the objective region is large, and on the other hand, when the resolution is low, the objective region is small. Thereby it is possible to restrain the visual deterioration. According to FIGS. 10, 11 and 12, the image processor in the third embodiment of the invention is explained hereinafter.

Figure 10:
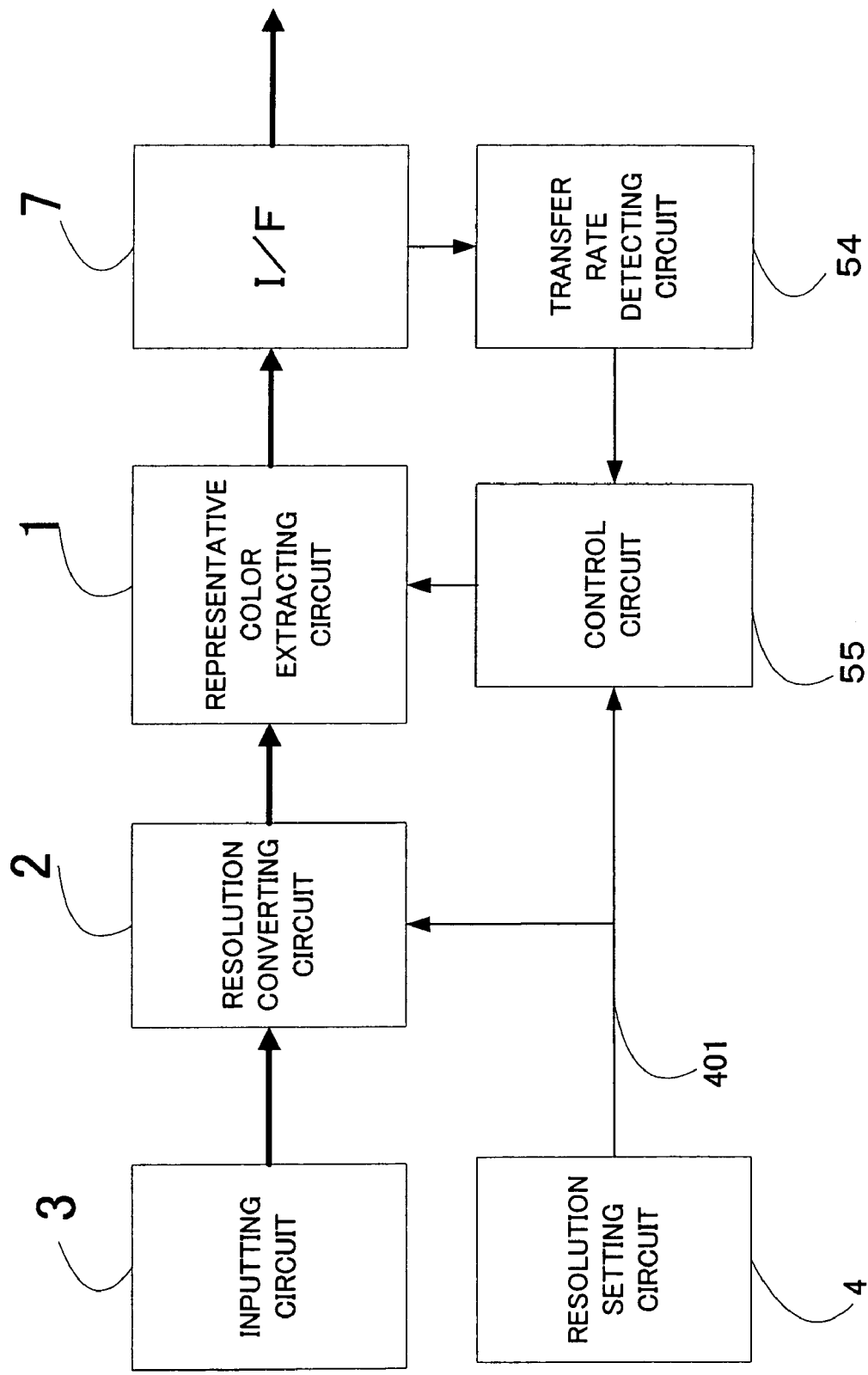
FIG. 10 is a block diagram of the image processor in the third embodiment of this invention.
Figure 11:
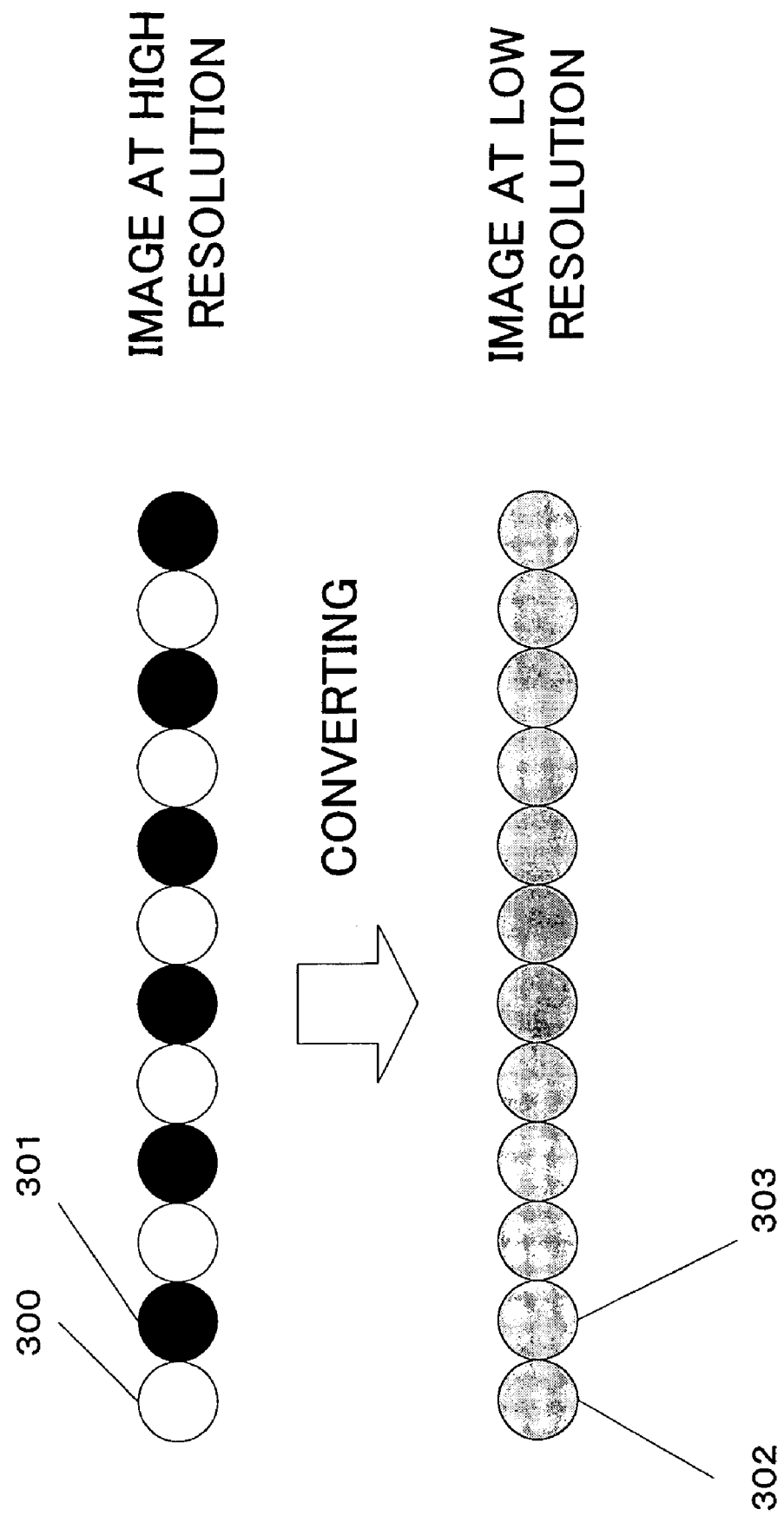
FIG. 11 is a schematic diagram of the processing of converting the resolution in the third embodiment of the invention.
Figure 13:
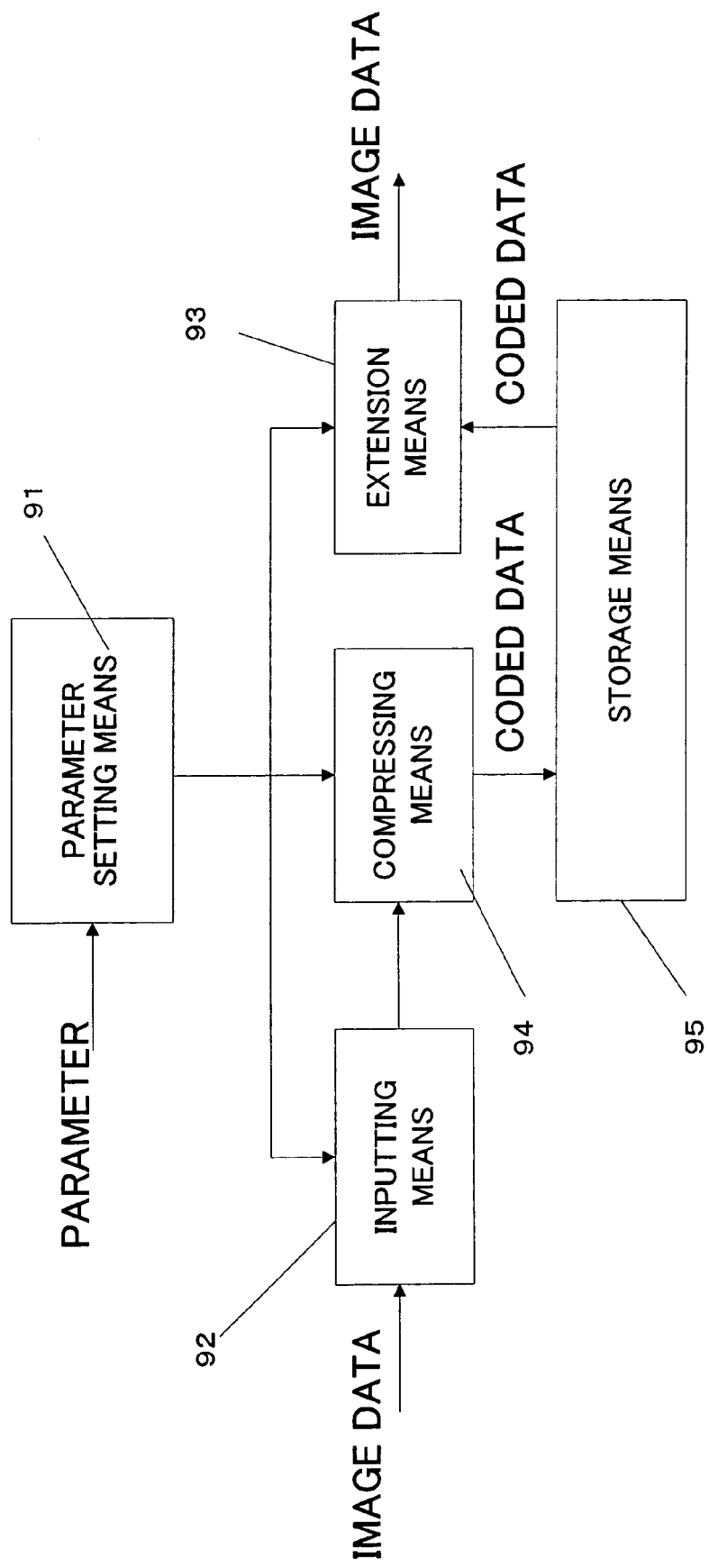
FIG. 13 is a block diagram showing a configuration of the conventional image processor.

FIG. 10 is a block diagram of the image processor in the third embodiment of the invention, and FIG. 11 is a schematic diagram of the resolution converting. FIG. 12 is a schematic diagram of the enlargement and reduction processing.

In FIG. 10, the resolution of images inputted from the inputting circuit 3 is converted from the high resolution to the low resolution by a resolution converting circuit 2. A resolution setting circuit 4 gives the resolution converting circuit 2 and the control circuit 55 the setting of resolution by the signal 401. In this case, if the setting of resolution that is 400 DPI in usual is converted to 200 DPI, for example, the resolution converting circuit 2 converts the density of pixels per pair of two consecutive pixels to a same one value. Next, the control circuit 55 sets (determines) the size of the small region to a half, for example, based on the obtained specific resolution setting. That is to say, in case where a region of 4 pixels×4 pixels is an object at the time of 400 DPI, the objective region changes to 2 pixels×2 pixels at the time of 200 DPI. Thereby, as much as the change of the original density becomes rough, the precision of the processing gets improved, and the deterioration of picture quality can be restrained. Subsequently, the representative color extracting circuit 1 extracts the representative color from the region set (determined) by the control circuit 55, and outputs the image data to the interface 7 (which is described as I/F 7 hereinafter).

Now, the resolution converting is explained in detail according to FIG. 11. As shown in FIG. 11, in case of changing the resolution from 400 DPI to 200 DPI, either one data of a signal (data) 300 and a signal (data) 301 is copied to the adjacent pixel. For instance, the signal 301 is copied to both the signals 302 and 303. Thereby, the black and white pattern of 400 DPI has disappeared by the deterioration of the resolution. In case of the actual processing, the signal 302 and 303 are the same value, so that the thinning processing is performed so as to leave either one value. This processing is equivalent to the reduction processing. Therefore, the resolution converting and the enlargement and reduction processing are handled as the similar processing (the same processing) as far as the circuit is concerned. Generally it is defined that the change of pixel number is defined as the enlargement processing, while the deterioration of the resolution without changing pixel number is defined as the resolution converting. However, the present invention defines both processing as the resolution converting. Therefore, in case of the enlargement and reduction processing, the resolution converting circuit 2 is used as the scale changing means for enlarge or reduce the image into a specific case. And the resolution setting circuit 4 sets the scale. According to the scale, the resolution converting circuit 2 increases or decreases the pixel number by using the pixel interpolation processing, the nearest neighbor processing, the bilinear processing, the bi-cubic processing, or the orthogonal transformation processing (the DTC transforming and the wavelet transforming), and thereby the enlargement and reduction processing are executed.

According to FIG. 12, the enlargement and reducing processing of the original images is explained hereinafter. As shown in FIG. 12C, when the original image is enlarged, the pixel number increases. In this case, even if the representative color is extracted from the larger region, the deterioration of picture quality is less. Accordingly, it is possible to gain the compression ratio by extracting the representative color from the larger region. On the other hand, as shown in FIG. 12A, the pixel number decreases by the reduction processing. Accordingly, since the spatial frequency of pattern on the original image gets high, it is necessary for the processing with the high resolution. For that reason, it is preferable that the region size should be set smaller. By setting the size of region smaller, it is also possible to retain the pattern with high spatial frequency, thereby the picture quality can be improved.

The compression ratio as determined in the embodiment 1 and 2 presupposes that the image data obtained from the inputting circuit 3 (image data of 400 DPI, for example) is not converted in the resolution. However, when the resolution converting circuit 2 converts the resolution (the enlargement or reduction processing), even if the control circuit 55 determines the compression ratio based only on the data obtained from the transfer rate detecting circuit 54, it is not sufficient.

That is to say, when the original shown in FIG. 12B is converted to the low resolution shown in FIG. 12A (in case of the reduction processing), the object of the processing must be set to be a smaller region according to the resolution as above, and the processing mode must be selected so as to suffice the required compression ratio (for example, the color number should be less). On the contrary, when the original shown in FIG. 12B is converted to the resolution shown in FIG. 12C (in case of the enlargement processing), the object of processing should be the larger region corresponding to the resolution as above, and the processing mode should be selected so as to suffice the required compression ratio (for example, the color number increases).

As described above, the invention of the third embodiment can retain the pattern of the high frequency and restrain the deterioration of the picture quality by changing the size of the region to extract the representative color according to the resolution. In addition, while keeping the picture quality, it is possible to improve the compression ratio.

Besides, each embodiment of the invention can be carried out by not only the software processing such as DSP or CPU, but also the hardware.

In addition, it is needless to say that the invention can be applied to not only the processing of static images, but also the processing of dynamic images. In case of applying the invention to the dynamic images, various methods like increasing the frame number per unit of hour can be adopted as the method of changing the compression ratio.

Effect of Invention

As described above, the invention has an effect that it is possible to store the digital data in the transfer end device without lack even if the device of the transfer source or transfer end is provided with a small buffer memory, since the digital data is compressed according to the transfer rate.

In addition, the invention has an effect that, by adopting the configuration that the suitable control parameter can be set according to the type of objective original when the digital data of the transfer object is image data, it is possible to restrain the deterioration of image data and transfer the images precisely.

Further more, in case of the resolution converting and the enlargement or reducing processing, since the size of region to extract the representative color is changed considering the resolution in addition to the transfer rate, it is possible to keep the pattern of density transition ratio between pixels and restrain the deterioration of picture quality. And the invention has an effect that the compression ratio can be improved keeping the picture quality.

What is claimed is:

1. A data transfer method of transferring image data comprising the steps of:
    detecting the data transfer capability of a transmission channel and a transfer end;
    changing the compression ratio of the image data corresponding to the data transfer capability and a processing mode selected in correspondence to a type of objective original;
    compressing the image data by replacing colors in a small region to be a unit of the image data processing with at least one approximate color corresponding to the changed compression ratio; and
    transferring the compressed image data to the transfer end.

2. A data transfer method according to claim 1, wherein the type of original is at least one of the "photo image", the "character image", or the "photo and character image".

3. A data transfer method of transferring image data comprising the steps of:
    detecting the data transfer capability of a transmission channel and a transfer end;
    enlarging or reducing the image data at a specific scale;
    determining the size of a small region to be a unit of the image data processing on the basis of the data transfer capability and the specific scale;
    changing the compression ratio of the image data by changing the pixel number or the approximate color number included in the small region on the basis of the data transfer capability;
    extracting one or more approximate colors from the determined small region;
    compressing the image data by replacing colors in the small region with at least one approximate color based on the changed compression ratio; and
    transferring the compressed image data to the transfer end.

4. A data transfer method according to claim 1 or 3, in which the step of changing of the compression ratio involves a step of selecting whether the image data should be compressed or not.

5. A data transfer system of transferring image data comprising:
    detecting means for detecting the data transfer capability of a transmission channel and a transfer end;
    control means for changing the compression ratio of the image data corresponding to the data transfer capability and the processing mode selected by a processing mode setting means for setting image data processing corresponding to a type of objective original;
    representative color extracting means for compressing the image data by replacing color in a small region to be a unit of the image data processing with at least one approximate color based on the changed compression ratio; and
    transferring means for transferring the compressed image data to the transfer end.

6. A data transfer system according to claim 5, wherein the type of original is at least one of the "photo image", the "character image", or the "photo and character image".

7. A data transfer system of transferring image data, comprising:
    detecting means for detecting the data transfer capability of a transmission channel and a transfer end;
    resolution converting means for enlarging or reducing the image data to a specific scale;
    control means for determining a size of a small region to be a unit of the image data processing on the basis of the data transfer capability and the specific scale, and changing the compression ratio of the image data by changing the pixel number or the approximate color number included in the small region corresponding to the data transfer capability;
    representative color extracting means for extracting one or more approximate colors from the determined small region, and compressing the digital image data by replacing colors in the small region with at least one approximate color based on the changed compression ratio; and
    transferring means for transferring the compressed digital image data to the transfer end.

8. A data transfer system according to claim 5 or 7, wherein the control means involves selecting whether the image data should be compressed or not.

* * * * *